United States Patent [19]
Guerin et al.

[11] Patent Number: 5,712,339
[45] Date of Patent: Jan. 27, 1998

[54] AQUEOUS POLYMER DISPERSIONS

[75] Inventors: Patrick Guerin, Meerbusch, Germany; Paul Sutton, Cardiff, United Kingdom; Emmanuelle Reynolds, Cardiff, United Kingdom; Philip Cossar, Cardiff, United Kingdom

[73] Assignee: Sartomer Company, Exton, Pa.

[21] Appl. No.: 628,358

[22] Filed: Apr. 5, 1996

[51] Int. Cl.$^6$ .............................. C08F 8/00; C08L 23/26; C08L 31/02

[52] U.S. Cl. ............... 524/515; 524/501; 524/502; 523/201; 525/193

[58] Field of Search ................... 523/201; 524/501, 524/502, 515, 193

[56] References Cited

U.S. PATENT DOCUMENTS

| | | | |
|---|---|---|---|
| 4,518,724 | 5/1985 | Kuwajima et al. | 524/515 |
| 4,683,260 | 7/1987 | Wickert | 524/512 |
| 5,098,955 | 3/1992 | Pettit, Jr. | 525/194 |
| 5,308,890 | 5/1994 | Snyder | 523/201 |
| 5,405,879 | 4/1995 | Uemae et al. | 523/201 |
| 5,424,355 | 6/1995 | Uemae et al. | 524/501 |
| 5,500,457 | 3/1996 | Sarkar | 523/201 |

FOREIGN PATENT DOCUMENTS

| | | |
|---|---|---|
| 0185465 | 6/1986 | European Pat. Off. . |
| 277690 | 4/1990 | Germany . |
| 5112655 | 5/1993 | Japan . |

*Primary Examiner*—Tae Yoon
*Attorney, Agent, or Firm*—Robert A. Koons, Jr.; Michael B. Fein

[57] ABSTRACT

An aqueous polymer dispersion containing polymer particles formed of at least two polymers, the polymer particles of the dispersion having a minimum film-forming temperature below 60° C. and being formed of two different polymers namely polymer A having a glass transition temperature ($T_{gA}$) of not more than 10° C., and forming from 5 to 65% by weight of the total polymer; and polymer B having a glass transition temperature ($T_{gB}$) of more than 25° C., and forming from 5 to 65% by weight of the total polymer; together with a multifunctional material (C) present in an amount of from 5 to 70% by weight of the total polymer system.

12 Claims, No Drawings

AQUEOUS POLYMER DISPERSIONS

This invention relates to aqueous polymer dispersions, the preparation thereof and to compositions containing them.

It is an object of the present invention to provide aqueous polymer dispersions which are particularly suitable for use as binder components of curable aqueous surface coating compositions.

It is particularly an object of the invention to provide aqueous polymer dispersions useful for the manufacture of radiation and/or heat curable aqueous coating compositions such as paints, varnishes, lacquers, and inks (including overprint varnishes) for application to substrates such as plastics, concrete, wood and paper. The compositions are especially suitable for application to wood as radiation curable compositions.

According to a first embodiment of the invention, therefore, there is provided an aqueous polymer dispersion containing polymer particles formed of at least two polymers, the polymer particles of the dispersion having a minimum film-forming temperature below 60° C. and being formed of two different polymers namely polymer A having a glass transition temperature ($T_{gA}$) of not more than 10° C., preferably from −70° to 10° C. and especially from −35° to 5° C., and forming from 5 to 65% by weight of the total polymer; and polymer B having a glass transition temperature ($T_{gB}$) of more than 25° C., preferably from 25° to 150° C. and especially from 60° to 130° C., and forming from 5 to 65% by weight of the total polymer; together with a multifunctional material (C) present in an amount of from 5 to 70% by weight of the total polymer system.

The term "multifunctional material" as used herein is intended to refer to a monomer or other organic material having at least two ethylenically unsaturated groups which can each, separately, take part in a free radical initiated addition copolymerization reaction. The reacting of these unsaturated groups is not necessarily the same; thus they can be of the same chemical nature (e.g. they may be (meth) acrylate groups) or may be of different chemical nature (e.g. may be a more reactive (meth)acrylate group and a less reactive allylic group).

In order to render the composition heat or radiation curable it may also contain, suitably in an amount of up to 5%, preferably 1 to 2.5%, by weight of the total polymer system, an appropriate initiator system which, if not water-soluble, may be emulsified in the water of the emulsion or may be grafted onto a latex polymer.

The glass transition temperatures of the polymers of the dispersion may be calculated using the Fox equation [T. G. Fox, Bull. Am. Physics Soc., Vol. 1 (3), page 123 (1956)] and may, in practice, be measured by programmed differential calorimetry.

The polymers (A) and (B) may be prepared by a multi-stage polymerization process or by blending of latices of the individually formed polymers. When prepared by successive emulsion polymerization stages, the polymer produced in the first-stage will be referred to as the "first polymer", and that in the second stage as the "second" polymer. The first stage polymer may comprise either of polymers A or B as may the second stage polymer provided that both individual polymers are present. Each polymerization stage leading to the formation of a particular polymer may in itself comprise one or more polymerization steps, provided that each step produces polymer having the same Tg. Thus, for example, when using conventional seeding procedures, the first polymer may be produced by a first step producing such polymer followed by a second step, using the same monomer composition, to provide additional polymer.

Each of the polymers making up the aqueous dispersion according to the invention is prepared by polymerization of at least one ethylenically unsaturated monomer, using a monomer composition which makes it possible to attain the desired glass transition temperature. Ethylenically unsaturated monomers which can be used include, for example, esters of acrylic acid or methacrylic acid, such as methyl acrylate, ethyl acrylate, n-butyl acrylate, 2-ethylhexyl acrylate, methyl methacrylate and n-butyl methacrylate; and aromatic vinyl monomers such as styrene and its derivatives, for example alpha-methyl styrene, vinyl toluene and tert-butyl styrene. The monomers forming polymer (A) may be identical to or different from those forming polymer (B). Particular preference is given to using butyl acrylate, methyl methacrylate and styrene.

Each polymer making up the aqueous dispersion according to the invention may optionally comprise up to 10 parts by weight of at least one water-soluble comonomer which is copolymerizable with the ethylenically unsaturated monomers, per 100 parts by weight of the said monomers. As water-soluble comonomers which can be used it is possible to mention, in particular, acrylic acid, methacrylic acid, acrylamide, methacrylamide, N-methylol acrylamide and N-methylol methacrylamide.

Similarly, each constituent polymer may contain up to 5 parts by weight, per 100 parts by weight of that monomer, one at least crosslinking monomer. Typically, these monomers crosslink during polymer formation without requirement of subsequent drying or other curing techniques. It is possible to mention, in particular, ethylene glycol diacrylate, ethylene glycol dimethacrylate, 1,3-butylene glycol diacrylate and divinyl benzene.

Similarly, each constituent polymer may contain up to 15 parts by weight, per 100 parts by weight of that monomer, one at least functional copolymerizable monomer, not included in the previous range of water soluble monomers, able with a specific functional group to improve film properties for instance such as adhesion or crosslinkable and grafting ability. As functional groups and related monomers able to improve adhesion on substrates, it is possible to mention, in particular, amine group such as oxazolidine groups in for example, oxazolidinylethyl methacrylate and acetoacetyl group in for example acetoacetoxyethyl methacrylate.

As functional groups and related monomers able to improve further crosslinkable and grafting ability, it is possible to mention, in particular, hydroxyl group in for example hydroxyl ethyl methacrylate, unsaturated group in for example dicyclopentadienyl methacrylate, acetoacetyl group in for example acetoacetoxyethyl methacrylate, amine group in for instance N-(iso-butoxymethyl)acrylamide and 2-tert butylamino ethyl methacrylate. Grafting and crosslinking reactions can take place in latex, during latex coalescence or film ageing. Specific conditions such as temperature, UV curing, pH, external reagents or catalyst may be required. Specific reagents such as isocyanate, epoxy resins, carbodiimide may be added after synthesis.

Similarly, each constituent polymer may contain grafted photoinitiator group. This grafted photoinitiator group may be obtained for example in using up to 10 parts by weight parts one at least benzophenone functionalised monomer such as UVECRYL P 36 (Red Cure Specialities S. A., Anderlecht, Belgium).

In addition, it is possible that one at least of these three types of monomers (water-soluble, functional and crosslinking) and photoinitiator group is not incorporated uniformly into one at least of the constituent polymers but added over a limited period of time during the polymerisation of monomers of one step in an appropriately higher concentration (e.g. up to 90%). This process is known as "shot process".

The minimum film-forming temperature of the polymer particles as a whole is less than 100° C. The minimum film-forming transition (MFFT or MFT) may be defined as the minimum temperature at which the particles of a polymer dispersion coalesce to form a continuous, crack free film.

The polymer dispersion preferably has a particle size of from 50 to 250 nm.

Methods of measuring and controlling the average particle size are well known in the art, for example as described by E. A. Collins, 18th Annual Short Course (June 1987) of the Institute of Polymer Emulsion, Lehigh University (Pennsylvania); by E. A. Collins, J. A. Davidson and C. A. Daniels, J. Paint Technology 47, 35 (1975) or using the operating principles of the AutoSizer Lo-C apparatus from Malvern Instruments.

As noted above, aqueous polymer dispersions in accordance with the invention may be prepared by a multi-stage polymerization process using, in each stage, a combination of monomers adapted to give the desired Tg characteristics to the polymer produced. It is often convenient to carry out the first polymerization steps in two steps, i.e. a seed polymer-producing step followed by a further polymerization step.

The polymerization can be carried out in the presence of up to approximately 1 part by weight, per 100 parts by weight of the monomers, of at least one chain transfer agent, in order to regulate the number-average molecular weight of the resulting polymer. Examples of compounds which can be used as chain transfer agents include mercaptocarboxylic acids and mercaptoalcohols having from 2 to 8 carbon atoms such as mercaptoacetic acid, 2-mercaptobenzoic acid, 2-mercaptoethanol and 3-mercapto-2-butanol and alkyl or alkylaryl thiols such as butanethiol, dodecylmercaptan and 2-methyl-5-tertio butyl thiophenol.

The ethylenically unsaturated monomers constituting each polymer of the dispersion may be emulsified by means of at least one anionic or nonionic surfactant, or may simply be introduced into a reactor in the form of a homogeneous mixture of monomers. In the latter case, an aqueous solution of one or more surfactants may be added simultaneously. It is preferable to use a combination of nonionic surfactant and anionic surfactant in order to prepare emulsions. Examples of nonionic surfactants include polyglucosides such as alkylpolyglucoside, polyethers such as condensates of ethylene oxide and propylene oxide, alkyl and alkylaryl ethers and thioethers of polyethylene glycols and polypropylene glycols, alkylphenoxypoly(ethylenoxy)ethanols, polyoxyalkylene derivatives of partial esters of long-chain fatty acids such as lauric, myristic, palmitic and oleic acids, condensates of ethylene oxide with higher alkane thiols, ethylene oxide derivatives of long-chain carboxylic acids and of alcohols, etc. These nonionic surfactants preferably contain approximately 5 to 100 ethylene oxide units per molecule and, more preferably, approximately 20 to 50 of such units. Examples of anionic surfactants which can be used, preferably in combination with the nonionic surfactants, include high molecular weight sulphates and sulphonates for example alkyl, aryl and alkylaryl sulphates and alkyl-, aryl- and alkylarylsulphonates of sodium and potassium, such as sodium 2-ethylhexyl sulphate, potassium 2-ethylhexyl sulphate, sodium nonyl sulphate, sodium undecyl sulphate, sodium tridecyl sulphate, sodium pentadecyl sulphate, sodium lauryl sulphate, sodium methylbenzenesulphonate, potassium methylbenzenesulphonate, potassium toluenesulphonate and sodium xylenesulphonate, the sulphonated derivatives of the nonionic surfactants listed above; the salt of phosphonic acid esters of nonionic surfactants listed above; dialkyl esters of alkali metal salts of sulphosuccinic acid, such as sodium diamylsulphosuccinate; and condensation products of formaldehyde/naphthalenesulphonic acid. The total quantity of surfactants used in the emulsion polymerization process varies from approximately 2 to 20% by weight, preferably approximately from 4 to 12% by weight, of the monomeric components. The weight ratio of anionic surfactant to nonionic surfactant should be between 0.01 and 1 approximately, preferably between approximately 0.05 and 0.5. The quantity of water used in the reaction medium is, in general, determined by the solids content desired in the aqueous dispersion according to the invention, which is generally between approximately 40% and 70%, preferably between 45 and 60% by weight.

The monomeric components of the dispersion are polymerized by means of effective quantities, preferably between 0.1 and 2%, approximately, by weight of the total charge of monomers, of at least one conventional free-radical initiator. Such an initiator is preferably substantially soluble in water. Such initiators comprise inorganic peroxides such as hydrogen peroxide and persulfate salts, organic peroxides such as tertio-butyl hydroperoxide, azo compounds such as 2,2'-azobis (2-amidinopropane) dihydrochloride and 4,4'-azobis (4-cyanopentanoic acid), and redox system such as for example combinations of persulfate salt and alkali metal bisulphite.

The polymerization temperature required to produce the aqueous polymers in each of the steps of the process is generally within a range from approximately 40° to 95° C.—preferably from approximately 55° to 85° C.—depending on the time envisaged for the polymerization. The polymerization time is generally from approximately 45 minutes to 6 hours for each of the two steps, this time increases as the polymerization temperature decreases.

In order to attain a final degree of conversion in the polymerization reaction of 100%, it may be desirable to follow the final step by cooking the aqueous polymer emulsion for approximately 30 to 90 minutes at a temperature which is higher, preferably by at least 9° C., than the polymerization temperature.

A complementary improvement of steps consists in the treatment of the aqueous polymer emulsion, after the final step or, if appropriate, after the cooking step, by means of a free-radical initiation system which has a short half-life at the temperature under consideration, in order to attain an overall degree of conversion which is close to 100% and/or a residual monomer content which does not exceed approximately 50 ppm. As examples of free-radical initiator systems it is possible to mention organic and inorganic peroxides such as tert-butyl hydroperoxide, butyl peroxide, hydrogen peroxide or alkali metal persulphates, in combination with a reducing agent such as sodium formaldehyde-sulphoxylate, ascorbic acid, Mohr's salt, etc. Such a treatment may be carried out at temperatures from 40° C. to 90° C., approximately, its duration depending on the chosen temperature and being preferably between 15 minutes and 3 hours, approximately.

If the latex prepared in conformity with the present invention appears too acid for the formulation of paints, it may be desirable to adjust its pH to a value of greater than 6, for example by means of any alkaline substance such as hydroxide of sodium, potassium or ammonium; or an organic amine such as triethanolamine.

Seeded polymerization is preferred for the first stage of the polymerization.

Where the polymer dispersed is produced by blending two pre-formed dispersions, each dispersion may be prepared by emulsion polymerization using the general technique, ingredients and auxiliary agents discussed above for a multi-stage polymerization.

The multi-functional material C, may or may not be emulsified in the water of the polymer dispersion. When so emulsified, it may be emulsified with the aid of surfactants as discussed above for the use in an emulsion polymerisation process.

A wide variety of multi-functional materials may be employed. Typical examples include:

1. Epoxy (meth)acrylates.
2. Urethane (meth)acrylates.
3. Multi-functional (meth)acrylate monomers.
4. Amine-(meth) acrylate adducts.

Epoxy (meth)acrylates are those products formed by the reaction of (meth)acrylic acid with an epoxy(glycidyl) functional component e.g. aliphatic and aromatic containing epoxy resins, epoxidised oils, acrylic polymers and acrylic grafted polymers in which the acrylic component contains pendent epoxy groups. Some of the (meth)acrylic acid may be replaced by other acids, both ethylenically unsaturated and saturated, so as to impart specific properties e.g. aliphatic acids, fatty acids and aromatic acids.

These products may alternatively be prepared by the reaction of a carboxylic acid functional component (e.g. polyesters and acrylic polymers) with a second component containing both epoxy groups and ethylenic unsaturation e.g. glycidyl (meth)acrylate.

Urethane (meth)acrylates are those products formed by the reaction of an isocyanate containing component with a hydroxyl containing component. At least one of these components must contain ethylenic unsaturation. Examples of isocyanate functional components are hexamethylene diisocyanate, isophorone diisocyanate, isocyanate functional acrylic polymers and polyurethanes, reaction products of hydroxyl functional components (e.g. poly-ethylene glycol, poly-propylene glycol and di-, tri- and etc-hydroxy aliphatic alcohols (e.g. glycerol and trimethylolpropane) and their ethoxylated, propoxylated and polycaprolactone analogs) with di-, tri- and etc-isocyanates (e.g. hexamethylene diisocyanate, isophorone diisocyanate and TDI). Examples of hydroxy containing ethylenically unsaturated components are hydroxyethyl (meth)acrylate and its ethoxylated, propoxylated and polycaprolactone analogs.

Multi-functional (meth)acrylate monomers are (meth) acrylic acid esters of di-, tri- and etc-hydroxyl alcohols (e.g. poly-ethylene glycol, poly-propylene glycol, aliphatic diols, neopentyl glycol, ethoxylated bisphenol A, trimethylolpropane, pentaerythritol, glycerol, di-trimethylolpropane, hydroxyl functional polyesters, dipentaerythritol and the ethoxylated, propoxylated and polycaprolactone analogs of all the above.

Amine-(meth)acrylate adducts are those products prepared by the partial "Michael Type Addition" of primary and secondary amines to ethylenic unsaturation i.e. the double bond of (meth)acrylate containing compounds. Of particular interest here are the multi-functional (meth)acrylate monomers as mentioned above. Examples of amine-acrylate adducts are diethylamine modified trimethylolpropane triacrylate and ethanolamine modified ethoxylated trimethylolpropane triacrylate.

All of the above listed acrylates and methacrylates may incorporate specific hydrophilic components to facilitate their being dissolved, emulsified or dispersed in an aqueous phase. Examples are the addition of secondary amines, phosphoric acid and anhydrides (e.g. succinic anhydride, phthalic anhydride and tetrahydrophthalic anhydride). The resulting tertiary amines and pendent carboxylic acid groups are then neutralised. Another hydrophilic group of particular interest is poly-ethylene glycol.

A variety of photoinitiators or thermal initiators may be employed. The photoinitiator may be added to the composition from about 0.1% by weight of total nonvolatiles to about 5.0% by weight of total nonvolatiles and more preferably from about 1.0% by weight of total nonvolatiles to about 2.5% by weight of total nonvolatiles. Useful photoinitiators include cleavage-type initiators, halogenated polynuclear ketones, such as chlorosulfonated benzanthrones, chlorosulfonated fluorenones, haloalkylated benzanthrones, and haloalkylated fluorenones as disclosed in US-A-3,827,957 and US-A-3,827,959; benzoin, its ethers, such as methyl ether, ethyl ether, isopropyl ether, butyl ether, octyl ether and the like; carbonyl compounds such as diacetyl, benzil and the like; sulfur compounds such as diphenyl sulfide, dithiocarbamate and the like; a chloromethyl naphthalene and anthracene. Other useful photoinitiators include alkylphenones and benzophenones as disclosed in US-A-3,759,807. Photoinitiators suitable for pigmented coatings are suggested in US-A-3,915,824 and US-A-3,847,771. Of particular interest for titanium dioxide pigmented formulations are the phosphine oxides e.g. 2,4,6-(trimethylbenzoyl) diphenylphosphine oxide.

The composition may contain a thermal initiator if the coating will be cured by heat or a catalyst if the coating will be cured by auto-oxidation. The thermal initiator is added to the composition from about 0.5% by weight of total nonvolatiles to about 2% by weight of total nonvolatiles. Useful thermal initiators include azo compounds, such as azobisisobutyronitrile and the like; organic peroxides, such as ketone peroxides, hydroperoxides, alkyl peroxides, acryl peroxides, peroxy esters and the like; and inorganic peroxides, such as ammonium persulphate, potassium persulphate, hydrogen peroxide and the like. Useful catalysts for auto-oxidative cure include the salts of cobalt, such as cobalt acetate, cobalt naphthenate and the like.

The present invention further provides a paint comprising an aqueous polymer emulsion as defined described above.

The formulation method employed may be any one of those known in the art of formulating latex paints. The aqueous paints according to the invention comprise a mixture of colouring agents, e.g. pigment and latex. Powdered filler may also be present.

Examples of powdered fillers include calcium carbonate, dolomite, talc, mica, barium sulphate, lime and cement; and example of pigments include titanium oxide, carbon black, copper phthalocyanine, zinc oxide, iron oxides and chromium oxide.

In addition to the pigments and fillers the coating compositions of the invention may contain other adjuvants such as dispersants [alkali metal silicates (especially metasilicates), alkali metal polyphosphates and alkali metal salts of organic polyacids (especially polyacrylates)]; wetting agents, [e.g. nonionic surfactants (for example polyether oxides)]; rheology modifiers or thickeners (e.g. water-soluble polymers modified by hydrophobic groups and hydroxyalkylcellulose derivatives); antifoam agents; biocides and anticorrosive agents.

The aqueous paints of the present invention may be applied to the desired substrate by conventional means, for example brush, roller, spray-gun, etc.

The paints of the invention, after application to the substrate may, where they contain a thermal initiator or external reagent, be cured by heating, e.g. at a temperature of from 70° to 150° C. for periods of from 3 min to 1 hour. When the paints contain photosensitizer they may be cured by irradiation to UV light. Useful radiation includes ionizing radiation, electron beam radiation and ultraviolet radiation. Sources of ultraviolet radiation include sunlight, mercury lamp, carbon-char lamp, xenon lamp and the like. Medium pressure mercury vapour lamps are preferred.

In order that the invention may be well understood the following Examples are given by way of illustration only.

The blocking resistance of formulations was evaluated by a test method based on ASTM blocking resistance test D4946.

The test solution is applied to sealed card using a 0.004 gap bar applicator. The applied panels are conditioned at room temperature for 1 hr (early blocking) and 24 hrs (later blocking) before testing.

Cured emulsion films are placed face-to-face and a pressure of about 127 g/M is applied. These paint films are either left at room temperature, or put into an oven at 50° C., to make the test more stringent. After cooling, the blocked panels are peeled apart. The degree of blocking is rated subjectively for tack or seal using series of standard descriptive terms corresponding to numerical ASTM values 10-0.

| Blocking resistance Numerical Ratings | Type of separation | Performance |
| --- | --- | --- |
| 10 | no tack | Perfect |
| 9 | trace tack | excellent |
| 8 | very slight tack | very good |
| 7 | very slight to slight tack | good to very good |
| 6 | slight tack | good |
| 5 | moderate tack | fair |
| 4 | very tacky; no seal | poor to fair |
| 3 | 5 to 25% seal | poor |
| 2 | 25 to 50% seal | poor |
| 1 | 50 to 75% seal | very poor |
| 0 | 75 to 100% seal | very poor |

Note: Numerical values may differ from operator to operator but relative ranking should be the same. The repeatability is estimated to be plus or minus one blocking unit.

The chemical resistance of the films was tested by the xylene swab test. Results are given in seconds before failure. The hardness of the films was tested by the Koenig hardness test.

EXAMPLES 1-10

Ten polymer emulsions were prepared by multistage polymerization, using two pre-emulsions having the following formulations:

| Pre-emulsion 1 (Polymer A) | |
| --- | --- |
| $X_1/1.5$ parts | water |
| $X_1/10$ parts | aqueous solution of 15% Sodium Dodecyl Sulphate |
| $X_1$ parts | monomers |

| Pre-emulsion 2 (Polymer B) | |
| --- | --- |
| $X_2/2$ parts | water |
| $X_2/10$ parts | aqueous solution of 15% Sodium Dodecyl Sulphate |
| $X_2$ parts | monomers |

[The sum of $X_1$ and $X_2$ is 100 parts].

The emulsion was prepared by the following general process.

1) An initial charge containing 41.4 parts water and 1.5 parts aqueous solution of 15% Sodium Dodecyl Sulphate was put into a reactor and heated to 85° C. 2) Once the initial charge had reached 85° C., the initial initiator solution (0.19 parts water and 0.05 parts sodium persulphate) was added and simultaneously feeding of (a) pre-emulsion (feeding time: 1 hour), and (b) the initiator solution (20 parts water and 0.4 parts sodium persulphate; feeding time—3 hours) were started maintaining a constant reactor temperature of 85° C.,+/−1° C.

3) At the end of the pre-emulsion 1 feed, the addition of the second feed of pre-emulsion 2 (feeding time : 1 hour) was started still maintaining a reaction temperature of 85° C.+/−1° C.

4) At the end of the second pre-emulsion feed, pipes and tanks are rinsed with 4.5 parts of water and the reaction was maintained for 1 hour at 85° C.

5) Then, the reactor was cooled to below 40° C. before starting the neutralising agent solution feed (feeding time 20 minutes) (1.18 parts water and 1.18 parts 25% ammonia).

The characteristics of the emulsions were: solid content: 43–44% pH 7.5–8.5.

The following monomer compositions were employed to give polymers of the desired Tg.

| Tg (°C.) | MMA (%) | BA (%) | MAA (%) |
| --- | --- | --- | --- |
| −13 | 22.5 | 75 | 2.5 |
| 22 | 51.0 | 46.5 | 2.5 |
| 70 | 77.7 | 19.8 | 2.5 |
| 130 | 97.5 | 0 | 2.5 |

MMA = methyl methacrylate
BA = butyl acrylate
MAA = methacrylic acid.

Each of the dispersions was formulated to give a coating composition in accordance with the following formulation.

| Ingredients | Function | Suppliers | 0% | 10%* | 20%* | 30%* |
| --- | --- | --- | --- | --- | --- | --- |
| Example 1 → 10 | | | | | | |
| polymer (43–44%) | Binder | | 92 | 79 | 68.7 | 61 |
| emulsified SR 351 (75%) | | | 0 | 5 | 9.85 | 15 |
| Darocur 1173 | Photo-initiator | Ciba-Geigy | 0 | 0.07 | 0.15 | 0.22 |
| Rheolate 278 (50% water) | Thickener | Rheox | 1.1 | 1.24 | 1.24 | 1.21 |
| Rheolate 255 (50% in water) | Thickener | Rheox | 1.1 | 0.57 | 0.52 | 0.59 |
| Fluorad FC 129 (10% in Isopropanol:water 1:2.75) | Surface Agent | 3M | 0.02 | 0.18 | 0.19 | 0.19 |
| Water | | | 5.8 | 14.1 | 19.3 | 21.6 |

*weight percentage of SR351 on the total amount of the solid polymer

The above coatings were as noted above (in the case of Examples 4–10) modified by blending in an appropriate amount of an emulsion prepared from the following ingredients.

| Ingredient   | Function              | Suppliers     | Amounts |
|--------------|----------------------|---------------|---------|
| SR 351*      | Multifunctional material | Craynor    | 75.0    |
| BHT          | Inhibitor            |               | 0.075   |
| Triton GR-5M | Dispersing           | Union Carbide | 2.5     |
| Water        |                      |               | 22.5    |

*Trimethylol propane triacrylate.

This emulsion was prepared by the steps of, at room temperature, putting in a vessel in the following order, SR 351, BHT and Triton GR-SM and then, with vigorous mixing with a Silverson stirrer, adding, during 20 minutes, water to give a creamy and stable emulsion.

The blocking resistance, Koenig hardness and chemical resistance and cracking of the formulations were evaluated. The results are shown below. Compound C is polyfunctional material introduced as an emulsion.

For testing clear films were drawn onto glass using ICI 0.004" bar gap applicator. The cure schedule before the exposure to UV-light was 30 min at room temperature followed by 30 min at 50° C. UV curing conditions were:

UV line speed: 3.25 m/min/Lamp

Lamp: Medium pressure Hg arc lamp.

The panels were left 24 hours at room temperature before testing (Blocking, Koenig hardness, Xylene Swab).

|            | $Tg_A$ | %  | $Tg_B$ | %  | C  | Early Blocking (20° C./50° C.) | Late Blocking (20° C./50° C.) | Koenig Hardness (%) | Xylene Swab |
|------------|--------|----|--------|----|----|-------------------------------|-------------------------------|---------------------|-------------|
| Example 1  | −13    | 50 | 22     | 50 | 0  | 0/0                           | 2/0                           | 12                  | 1           |
| Example 2  | −13    | 50 | 70     | 50 | 0  | 6/3                           | 8/3                           | 17                  | 4           |
| Example 3  | −13    | 50 | 130    | 50 | 0  | 7/4                           | 8/4                           | 27                  | 3           |
| Example 4  | −13    | 45 | 22     | 45 | 10 | 2/0                           | 4/0                           | 20                  | 12          |
| Example 5  | −13    | 40 | 22     | 40 | 20 | 2/0                           | 4/0                           | 27                  | 25          |
| Example 6  | −13    | 35 | 22     | 35 | 30 | 3/0                           | 5/0                           | 31                  | 50          |
| Example 7  | −13    | 45 | 70     | 45 | 10 | 8/7                           | 9/8                           | 27                  | 12          |
| Example 8  | −13    | 40 | 70     | 40 | 20 | 10/9                          | 10/9                          | 36                  | 25          |
| Example 9  | −13    | 35 | 70     | 35 | 30 | 10/9                          | 10/9                          | 41                  | 60          |
| Example 10 | −13    | 35 | 70     | 35 | 20 | 10/9                          | 10/9                          | 35                  | 27          |

We claim:

1. An aqueous polymer dispersion containing polymer particles formed of at least two polymers, the polymer particles of the dispersion having a minimum film-forming temperature below 60° C. and being formed of two different polymers, each prepared by polymerization of at least one ethylenically unsaturated monomer, namely polymer A having a glass transition temperature ($T_{gA}$) of not more than 10° C., and forming from 5 to 65% by weight of the total polymer; and polymer B having a glass transition temperature ($T_{gB}$) of more than 25° C., and forming from 5 to 65% by weight of the total polymer; together with a multifunctional material (C) present in an amount of from 5 to 70% by weight of the total polymer system, said multifunctional material having at least two ethylenically unsaturated groups.

2. An aqueous polymer dispersion as claimed in claim 1, wherein polymer A has a glass transition temperature from −70° to 10° C., and polymer B has a glass transition temperature from 25° to 150° C.

3. An aqueous polymer dispersion as claimed in claim 2, wherein polymer A has a glass transition temperature from −35° to 5° C., and polymer B has a glass transition temperature from 60° to 130° C.

4. An aqueous polymer dispersion as claimed in anyone of claims 1 to 3, also containing up to 5% by weight, based on the weight of the total polymer system, of an initiator system to render the composition heat or radiation-curable.

5. An aqueous polymer dispersion according to claim 1 wherein the multifunctional material (C) is selected from the group consisting of epoxy (meth)acrylates, urethane (meth)acrylates, multi-functional (meth)acrylates, and amine (meth)acrylate adducts.

6. An aqueous polymer dispersion according to claim 1 wherein the multifunctional material (C) is the reaction product of (meth)acrylic acid with an epoxy (glycidyl) functional component selected from the group consisting of aliphatic and aromatic containing epoxy resins, epoxidized oils, and acrylic polymers containing pendant epoxy groups.

7. An aqueous polymer dispersion according to claim 1 wherein the multifunctional material (C) is selected from the group consisting of reaction products of an isocyanate containing component and a hydroxyl containing component which is unsaturated wherein said isocyanate containing component is selected from hexamethylene diisocyanate, isophorone diisocyanate, isocyanate-functional acrylic polymers, and isocyanate-functional polyurethanes.

8. An aqueous polymer dispersion according to claim 1 wherein the multifunctional material (C) is selected from the group consisting of reaction products of an isocyanate containing component and a hydroxyethyl (meth)acrylate, ethoxylated hydroxyethyl (meth)acrylate, propoxylated hydroxyethyl (meth)acrylate and reaction product of hydroxyethyl (meth)acrylate and caprolactone.

9. An aqueous polymer dispersion according to claim 4 wherein said initiator system comprises a photoinitiator from about 0.1 to about 5% by weight based on total non-volatile components.

10. An aqueous polymer dispersion according to claim 4 wherein said initiator system comprises a thermal initiator from about 0.5 to about 2% by weight based on total non-volatiles.

11. An aqueous polymer dispersion according to claim 1 containing an auto-oxidation cure catalyst.

12. A paint comprising a composition as claimed in any one of claims 1, 2, 3, 5, 6, 7, 8, 9, 10, or 11.

* * * * *